United States Patent
Akeda et al.

(10) Patent No.: US 8,148,468 B2
(45) Date of Patent: Apr. 3, 2012

(54) REACTIVE HOT MELT ADHESIVE COMPOSITION AND METHOD FOR PRODUCING THE SAME

(75) Inventors: Kana Akeda, Aichi (JP); Koji Terada, Aichi (JP)

(73) Assignee: Mitsubishi Rayon Co., Ltd., Tokyo (JP)

(*) Notice: Subject to any disclaimer, the term of this patent is extended or adjusted under 35 U.S.C. 154(b) by 210 days.

(21) Appl. No.: 12/575,114

(22) Filed: Oct. 7, 2009

(65) Prior Publication Data
US 2010/0258245 A1 Oct. 14, 2010

(30) Foreign Application Priority Data
Apr. 10, 2009 (JP) ................. 2009-095855

(51) Int. Cl.
*C08F 8/30* (2006.01)

(52) U.S. Cl. ............. 525/131; 526/273; 526/307.1; 156/305; 156/331.4

(58) Field of Classification Search ........... 526/273, 526/307.1; 525/131; 156/305, 331.4
See application file for complete search history.

(56) References Cited

U.S. PATENT DOCUMENTS
2004/0249076 A1* 12/2004 Slark ............. 525/123

FOREIGN PATENT DOCUMENTS
| JP | 2003-193019 | 7/2003 |
| JP | 2006-282935 | * 10/2006 |
| JP | 2008-500406 | 1/2008 |

* cited by examiner

Primary Examiner — Ling-Siu Choi
(74) Attorney, Agent, or Firm — Oblon, Spivak, McClelland, Maier & Neustadt, L.L.P.

(57) ABSTRACT

Disclosed are a reactive hot melt adhesive composition having no problem in the initial adhesive strength, the adhesive strength obtained after moisture curing, stringiness and the like, and a method for producing the same. In the method, 1 to 50 parts by mass of a polymer (A), which is obtained by polymerization of a monomer composition including a vinyl monomer having a carboxyl group and a vinyl monomer having an epoxy group and has the equivalent ratio of the carboxyl group to the epoxy group in the range of 1/100 to 100/1, is mixed with 99 to 50 parts by mass in total of a polyisocyanate (B) and a polyol (C) so that the amount of the isocyanate group can become 1.1 to 10 moles relative to 1 mole of the hydroxyl group of the polyol (C), the sum of the components (A) to (C) being 100 parts by mass, and the resulting mixture is heated and mixed.

15 Claims, No Drawings

REACTIVE HOT MELT ADHESIVE COMPOSITION AND METHOD FOR PRODUCING THE SAME

BACKGROUND OF THE INVENTION

1. Field of the Invention

The present invention relates to a reactive hot melt adhesive composition (hereinafter, unless otherwise stated, will be referred to as "RHMA"), and a method for producing the same.

2. Description of the Related Art

A hot melt adhesive is an adhesive which is solid or semi-solid at room temperature, and melts when heated, to thereby obtain fluidity. This adhesive bonds an adherend to a base material, as the adhesive is applied on the base material in a molten state, and then the adherend is laminated thereon, or as the adhesive is inserted between the base material and the adherend in the form of a solid sheet, melted by heating, and then resolidified by cooling. Therefore, many hot melt adhesives are produced from thermoplastic polymers.

In particular, adhesives containing, as a main component, a urethane prepolymer having an isocyanate group at the chain terminals are called as a "reactive hot melt adhesive (RHMA)", and most of such urethane adhesives are moisture-curable. The urethane adhesives usually contain, as a main component, an isocyanate group-having urethane prepolymer produced by polycondensation of a polyol component and a polyisocyanate component.

Such a RHMA is applied on a base material while being in a heated molten state, is cooled to solidify, and then undergoes moisture curing caused by a chemical cross-linking reaction of the isocyanate group subjecting with moisture (water), to thereby form a tough adhesive layer having heat and chemical resistances.

Conventional RHMAs exhibit excellent adhesiveness when chemical cross-linking is formed as a result of moisture curing. However, since most of the RHMAs do not undergo chemical cross-linking reaction immediately after being applied, and since the adhesives have high temperature and high fluidity immediately after being heated and melted, the initial adhesive strength to the base material is insufficient. Here, the initial adhesive strength means the adhesive strength that is obtainable 2 to 5 minutes after the adhesive is applied on a base material.

As a product which has solved the problem described above, a RHMA produced by heating and mixing of a polyisocyanate and an acrylic polymer having a hydroxyl group, is known (see WO2004/111102).

There is also known a RHMA produced by heating and mixing of a urethane prepolymer and an acrylic polymer having an epoxy group (see JP 2003-193019 A).

However, in regard to the former RHMA, the initial adhesive strength is not sufficient because the reactive functional group possessed by the acrylic polymer is only a hydroxy group, and the hot melt adhesives tend to have increased stringiness when melted and applied on a base material.

The term "stringiness" means that when a hot melt adhesive is applied on a base material with a heated nozzle, a sprayer, a coater or the like, fine strings are drawn between the adhesive applicator and the base material which serves as an adherend. Furthermore, increased stringiness implies that the adhesive sticks to the applicator or the manufacturing machinery, and handleability thereof is deteriorated.

On the other hand, in regard to the latter reactive hot melt adhesive, the initial adhesive strength is insufficient because the reactive functional group possessed by the acrylic polymer is only an epoxy group.

SUMMARY OF THE INVENTION

Therefore, it is an object of the present invention to provide a reactive hot melt adhesive composition which does not have any problem in the initial adhesive strength, the adhesive strength after moisture curing, stringiness and the like.

The present invention is a method for producing a reactive hot melt adhesive composition, comprising heating a mixture of:

a polymer (A) obtained by polymerization of a monomer mixture including a vinyl monomer having a carboxyl group and a vinyl monomer having an epoxy group,
a polyisocyanate (B), and
a polyol (C).

Also, the present invention is a hot melt adhesive composition obtained by the above-described method for production.

Further, the present invention is a method for carrying out adhesion, including heating and melting the hot melt adhesive composition described above, applying the molten adhesive composition on a base material, and then allowing the adhesive composition to moisture cure.

And also, the present invention is a polymer used for reactive hot melt adhesives, obtained by polymerization of a monomer mixture including at least a vinyl monomer having a carboxyl group and a vinyl monomer having an epoxy group by heat after suspension of the monomer mixture in water containing a dispersant and addition of a polymerization initiator, wherein an equivalent ratio of the carboxyl group/epoxy group in the monomer mixture is in the range of 1/100 to 100/1.

The RHMA of the present invention has enhanced initial adhesive strength obtained before moisture curing, enhanced adhesive strength obtained after moisture curing, improved stringiness, and enhanced handleability, because the polymer (A) has a carboxyl group and an epoxy group as the reactive functional groups. Furthermore, a RHMA having the aforementioned characteristics can be easily provided by the method for producing a reactive hot melt adhesive of the present invention.

DETAILED DESCRIPTION OF THE INVENTION

Hereinafter, the present invention will be described in detail.

The method for producing a RHMA of the present invention comprises heating a mixture of a polymer (A) obtained by polymerization of a monomer composition including at least a vinyl monomer having a carboxyl group and a vinyl monomer having an epoxy group, a polyisocyanate (B), and a polyol (C).

In the present invention, it is speculated that a cross-linked structure is formed by a reaction between an isocyanate group and a hydroxy group generated when the epoxy group and the carboxyl group in the polymer (A) partly undergo an addition reaction, a reaction between an isocyanate group and at least one of the epoxy group and carboxyl group of the polymer (A), a reaction between the hydroxyl group in the polyol (C) and the epoxy group of the polymer (A), or the like, and thus the initial adhesive strength of the obtained RHMA is increased.

Furthermore, in the present invention, since the polymer (A) is a product of copolymerization of the vinyl-based monomer having a carboxyl group and the vinyl-based monomer having an epoxy group, the carboxyl groups and the epoxy groups are uniformly distributed in the polymer (A), and as the functional groups react uniformly, strong cross-linking is rapidly formed.

In the present invention, the vinyl monomer having a carboxyl group is not particularly limited, but examples thereof include carboxyl group-containing vinyl monomers such as (meth)acrylic acid, 2-(meth)acryloyloxyethylhexahydrophthalic acid, 2-(meth)acryloyloxypropylhexahydrophthalic acid, 2-(meth)acryloyloxyethyltetrahydrophthalic acid, 2-(meth)acryloyloxypropyltetrahydrophthalic acid, 5-methyl-2-(meth)acryloyloxyethylhexahydrophthalic acid, 2-(meth)acryloyloxyethylphthalic acid, 2-(meth)acryloyloxypropylphthalic acid, 2-(meth)acryloyloxyethylmaleic acid, 2-(meth)acryloyloxypropylmaleic acid, 2-(meth)acryloyloxyethylsuccinic acid, 2-(meth)acryloyloxypropylsuccinic acid, 2-(meth)acryloyloxyethyloxalic acid, 2-(meth)acryloyloxypropyloxalic acid, crotonic acid, fumaric acid, maleic acid, itaconic acid, and sorbic acid; acid anhydride group-containing vinyl monomers such as itaconic anhydride and maleic anhydride; and monoesters of dicarboxylic acids such as monomethyl itaconate. One or more of these compounds are appropriately selected and used. Among them, (meth) acrylic acid is preferred from the viewpoint that the copolymerizability with other vinyl monomers is good.

In the present specification, the expression "(meth)acrylic acid" means "at least one of acrylic acid and methacrylic acid," and the expression "(meth)acryloyl" means "at least one of acryloyl and methacryloyl."

In the present invention, the vinyl monomer having an epoxy group is not particularly limited, but examples thereof include glycidyl(meth)acrylate, glycidyl α-ethylacrylate, glycidyl α-n-propylacrylate, glycidyl α-n-butylacrylate, 3,4-epoxybutyl(meth)acrylate, 6,7-epoxyheptyl(meth)acrylate, 6,7-epoxyheptyl α-ethylacrylate, o-vinylbenzyl glycidyl ether, m-vinylbenzyl glycidyl ether, and p-vinylbenzyl glycidyl ether. One or more of these are appropriately selected and used. Among them, glycidyl methacrylate is preferred from the viewpoint that the copolymerizability with the vinyl monomers having a carboxyl group and other below-mentioned vinyl monomers is good.

The polymer (A) of the present invention may also be copolymerized another vinyl monomer, with the vinyl monomer having a carboxyl group and the vinyl monomer having an epoxy group.

The other vinyl monomer is not particularly limited, but examples thereof include (meth)acrylate monomers such as methyl(meth)acrylate, ethyl (meth)acrylate, n-propyl(meth)acrylate, i-propyl(meth)acrylate, n-butyl (meth)acrylate, i-butyl(meth)acrylate, sec-butyl(meth)acrylate, t-butyl (meth)acrylate, n-octyl(meth)acrylate, 2-ethylhexyl(meth) acrylate, n-lauryl (meth)acrylate, n-stearyl(meth)acrylate, cyclohexyl(meth)acrylate, phenyl (meth)acrylate, benzyl (meth)acrylate, isobornyl(meth)acrylate, 2-methoxyethyl (meth)acrylate, 2-ethoxyethyl(meth)acrylate, phenoxyethyl (meth)acrylate, 2-(2-ethylhexaoxy)ethyl(meth)acrylate, 1-methyl-2-methoxyethyl (meth)acrylate, 3-methoxybutyl (meth)acrylate, 3-methyl-3-methoxybutyl (meth)acrylate, o-methoxyphenyl(meth)acrylate, m-methoxyphenyl (meth) acrylate, p-methoxyphenyl(meth)acrylate, o-methoxyphenylethyl (meth)acrylate, m-methoxyphenylethyl(meth)acrylate, and p-methoxyphenylethyl(meth)acrylate; hydroxyl group-containing (meth)acrylate monomers such as 2-hydroxyethyl(meth)acrylate, 2-hydroxypropyl (meth)acrylate, 3-hydroxypropyl(meth)acrylate, 2-hydroxybutyl(meth)acrylate, 4-hydroxybutyl(meth)acrylate, and glycerol (meth) acrylate; adducts of 2-hydroxyethyl(meth)acrylate with ethylene oxide, propylene oxide, γ-butylolactone, ε-caprolactone or the like; dimers or trimers of 2-hydroxyethyl (meth)acrylate, 2-hydroxypropyl(meth)acrylate or the like; and vinyl monomers such as styrene, α-methylstyrene, vinyltoluene, (meth)acrylonitrile, vinyl acetate, and vinyl propionate. From the viewpoints of modification of the performance of the adhesive composition or mitigation of the reaction between the carboxyl group and the epoxy group during the polymerization process, it is preferable to use methyl methacrylate, n-butyl methacrylate or n-butyl acrylate. One or more of these compounds can be appropriately selected and used.

In the present specification, the expression "(meth)acrylate" means "at least one of acrylate and methacrylate," and the expression "(meth)acrylonitrile" means "at least one of acrylonitrile and methacrylonitrile."

In the present invention, the acid value of the polymer (A) is not particularly limited, but is preferably in the range of 1 to 200 mg KOH/g, and particularly preferably 5 to 150 mg KOH/g. When the acid value of the polymer (A) is 1 mg KOH/g or larger, the reactivity of the acid group with the epoxy group during preparation of the RHMA, the initial adhesiveness to a substrate at the time of application of the RHMA, and the adhesive strength obtained after moisture curing are enhanced.

Also, when the acid value of the polymer (A) is 200 mg KOH/g or smaller, a decrease in the storage stability of the polymer (A), which results from the reaction between the acid and the epoxy group in the polymer (A), can be prevented.

In regard to the polymer (A), the equivalent ratio of the carboxyl group to the epoxy group is 1/100 to 100/1, preferably 1/75 to 75/1, and particularly preferably 1/50 to 50/1. When the equivalent ratio of the carboxyl group to the epoxy group of the polymer (A) is 1/100 to 100/1, the three functional groups, i.e., the epoxy group, the carboxyl group and the isocyanate group sufficiently undergo a cross-linking reaction, and the initial adhesive strength and the adhesive strength obtained after moisture curing become adequate. Here, the equivalent ratio of the carboxyl group to the epoxy group of the polymer (A) is defined as the equivalent ratio of the functional groups of the respective monomers at the time of feeding for polymerization.

In regard to the polymer (A), the amount of the carboxyl group and the epoxy group is not particularly limited as long as the equivalent ratio of them falls in the above-described range, but it is preferable that 100 parts by mass of the vinyl monomer mixture include 0.5 to 50 parts by mass of the vinyl monomer having a carboxyl group, 0.5 to 50 parts by mass of the vinyl monomer having an epoxy group, and 0 to 99 parts by mass of the other monomers. More preferred proportion ranges include 0.5 to 40 parts by mass of the vinyl monomer having a carboxyl group, 0.5 to 40 parts by mass of the vinyl monomer having an epoxy group, and 20 to 99 parts by mass of the other monomers. When the total of the proportions of the vinyl monomer having a carboxyl group and the vinyl monomer having an epoxy group in the polymer (A) is 1 to 80 parts by mass, the reactivity with the isocyanate group is satisfactory, and the initial adhesive strength and the adhesive strength obtained after moisture curing become adequate.

In the present invention, the polymer (A) has a weight average molecular weight (Mw) in the range of 5,000 to 50,000, preferably 10,000 to 40,000, and particularly preferably 15,000 to 25,000. When the Mw of the polymer (A) is 5,000 or larger, the initial adhesive strength, the heat resistance after moisture curing, the adhesive strength and toughness of the RHMA are enhanced. Furthermore, when the Mw of the polymer (A) is 50,000 or smaller, the stringiness of the RHMA is improved, and handleability thereof is enhanced.

In the present invention, the ratio of weight average molecular weight/number average molecular weight (Mw/Mn) of the polymer (A) is not particularly limited, but is preferably 4 or less, and more preferably 3 or less. When the ratio of Mw/Mn of the polymer (A) is 4 or less, the adhesive strength obtained after moisture curing is enhanced.

The glass transition temperature (Tg) of the polymer (A) is preferably in the range of 70 to 100° C. When the glass transition temperature of the reactive hot melt adhesive is 70° C. or higher, the time for moisture curing of the RHMA tends to be shortened, or the adhesive strength obtained after moisture curing tends to be enhanced. Also, when the glass transition temperature of the RHMA is 100° C. or lower, the viscosity at the time of production of the RHMA decreases, and handleability thereof tends to be enhanced.

In the present invention, the glass transition temperature (Tg) of the polymer (A) is a value obtained by conversion of the absolute temperature (° K.) calculated by the following formula (1), to the temperature in Celsius (° C.).

$$1/Tg = \Sigma(w_i/Tg_i) \quad (1)$$

wherein $w_i$ represents the proportion by mass of a monomer i constituting the polymer; $Tg_i$ represents the glass transition temperature of a homopolymer of the monomer i constituting the polymer (A); and Tg and $Tg_i$ in the formula (1) are values expressed in absolute temperature (K). For the $Tg_i$ of the respective monomers, the values described in the "Polymer Handbook, Fourth Edition, edited by Brandrup, J., et al., published by John Wiley & Sons, Inc., New York, 1999, pp. VI/193-253" are used.

As the method for producing the polymer (A) to be used in the present invention, known polymerization methods such as a suspension polymerization method, a bulk polymerization method, a solution polymerization method, and an emulsion polymerization method can be applied without hindrance. However, since the polymer (A) is a product of polymerization of a monomer composition containing at least a monomer having a carboxyl group and a monomer having an epoxy group, it is required that these functional groups do not react with each other to gelate at the time of polymerization. Furthermore, since the RHMA is without solvent, it is preferable to employ the suspension polymerization method, in which the polymer can be easily obtained as solid particles only by operation of filtration, washing, dehydration and drying after polymerization.

The suspension polymerization method may be carried out under known conditions such as the conditions described in JP 2006-282935A. Hereinafter, an example of the method for producing the polymer (A) by suspension polymerization will be presented.

A raw material monomer mixture is suspended in water containing a dispersant, a polymerization initiator is added thereto, subsequently the aqueous suspension is heated to thereby allow the polymerization reaction to proceed, and the aqueous suspension obtained after polymerization is filtered, washed, dehydrated and dried. Since the resulting polymer is in the form of solid particles, the reactivity of the carboxyl group and the epoxy group is low, and the storage stability is very satisfactory. In addition, there is an advantage that even if the carboxyl group and the epoxy group react with each other during polymerization, since the polymer is in the form of cross-linked particles resulting from completion of the polymerization within dispersed liquid droplets, the system as a whole does not gelate.

The dispersant to be used herein is not particularly limited, but examples thereof include alkali metal salts of poly(meth)acrylic acid, alkali metal salts of a copolymer of (meth)acrylic acid and methyl(meth)acrylate, polyvinyl alcohols having a degree of saponification of 70 to 100%, and methylcellulose. The amount of the dispersant is not particularly limited, but may be in the range of 0.005 to 5% by mass, and preferably 0.01 to 1% by mass, in the aqueous suspension. When the amount of the dispersant used is within this range, the dispersion stability of the suspension polymerization liquid is satisfactory, and the resulting particulate polymer has satisfactory washability, dehydration property, dryability and fluidity. Electrolytes such as sodium carbonate, sodium sulfate and manganese sulfate may also be used for the purpose of enhancement of the dispersion stability of the suspension polymerization liquid.

Here, the polymerization initiator to be used is not particularly limited, but examples thereof include azo compounds such as 2,2'-azobisisobutyronitrile, 2,2'-azobis(2-methylbutyronitrile) and 2,2'-azobis(2,4-dimethylvaleronitrile); organic peroxides such as benzoyl peroxide, lauroyl peroxide, t-butylperoxy-2-ethylhexanoate, t-hexylperoxy-2-ethylhexanoate, 1,1,3,3-tetramethylbutylperoxy-2-ethylhexanoate, and t-hexyl hydroperoxide; and inorganic peroxides such as hydrogen peroxide, sodium persulfate and ammonium persulfate.

Furthermore, it is preferable to use a chain transfer agent for the purpose of adjustment of the molecular weight of the resulting polymer. The chain transfer agent to be used is not particularly limited, but examples thereof include mercaptans such as n-dodecylmercaptan; thioglycolic acid esters such as octyl thioglycolate; α-methylstyrene dimer, and terpinolene. Among them, primary or secondary mercapto compounds are preferred, since the polymer obtained by suspension polymerization has satisfactory initial adhesive strength and adhesiveness to base materials.

The primary or secondary mercapto compounds are not particularly limited, but examples thereof include alkylmercaptans such as n-butylmercaptan, sec-butylmercaptan, n-octylmercaptan, n-dodecylmercaptan, and n-octadecylmercaptan; thioglycolic acid esters such as 2-ethylhexyl thioglycolate, methoxybutyl thioglycolate, and trimethylolpropane tris(thioglycolate); and mercaptopropionic acid esters such as 2-ethylhexyl β-mercaptopropionate, 3-methoxybutyl β-mercaptopropionate, and trimethylolpropane tris (β-thiopropionate). One or more of these compounds may be appropriately selected and used. Among them, n-octylmercaptan, n-dodecylmercaptan and 2-ethylhexyl thioglycolate are preferred, since they have large chain transfer constants.

The amount of the chain transfer agent used is not particularly limited, but is preferably in the range of 0.05 to 10 parts by mass, and more preferably in the range of 0.1 to 5 parts by mass, relative to 100 parts by mass of the monomer mixture. When the amount of the chain transfer agent used is 0.05 parts by mass or more, the molecular weight of the copolymer is decreased due to the chain transfer of radicals, and the adhesiveness to base materials is enhanced. Also, when the amount of the chain transfer agent used is 10 parts by mass or less, the residual amounts of unreacted monomers and the chain transfer agent is decreased, and the odor is reduced.

The temperature for suspension polymerization is in the range of 50 to 130° C., and preferably 60 to 100° C. Within this range of polymerization temperature, polymerization can be completed in a relatively short time, and the dispersion stability at the time of suspension polymerization is satisfactory, while the reaction between the carboxyl group and the epoxy group is difficult to proceed.

As the polyol (C) that can be used in the present invention, polyether polyols, polyester polyols, ethylene oxide or propylene oxide adducts of polyols, mixtures thereof, and the like can be mentioned. Specifically, the polyether polyols are not particularly limited, but examples thereof include polyoxyalkylene polyols such as polyethylene glycol, polypropylene glycol, and polybutylene glycol. One or more of these compounds may be appropriately selected and used.

Since polyether polyols have low viscosity and satisfactory handleability, and are suitable for dissolving the polymer (A), while polyester polyols have high heat resistance and solvent resistance, and have high strength, it is preferable to use the two substances in combination.

The amount of use of the polyol (C) is preferably in the range of 30 to 70 parts by mass in 100 parts by mass of the total raw materials fed for the reactive hot melt adhesive. When the amount of use of the polyol (C) is 30 parts by mass or more, the viscosity is decreased, and handleability is satisfactory. When the amount of use thereof is 70 parts by mass or less, the adhesive strength obtained after moisture curing is satisfactory.

The polyisocyanate (B) is not particularly limited, but examples thereof include ethylene diisocyanate, ethylidene diisocyanate, propylene diisocyanate, butylene diisocyanate, hexamethylene diisocyanate, toluene diisocyanate, cyclopentylene-1,3-diisocyanate, cyclohexylene-1,4-diisocyanate, cyclohexylene-1,2-diisocyanate, 4,4'-diphenylmethane diisocyanate, 2,2-diphenylpropane-4,4'-diisocyanate, p-phenylene diisocyanate, m-phenylene diisocyanate, xylylene diisocyanate, 1,4-naphthylene diisocyanate, 1,5-naphthylene diisocyanate, diphenyl-4,4'-diisocyanate, azobenzene-4,4'-diisocyanate, diphenylsulfone-4,4'-diisocyanate, dichlorohexamethylene diisocyanate, furfuridene diisocyanate, 1-chlorobenzene-2,4-diisocyanate, 4,4',4''-triisocyanatotriphenylmethane, 1,3,5-triisocyanatobenzene, 2,4,6-triisocyanatotoluene, and 4,4'-dimethyldiphenylmethane-2,2',5,5'-tetraisocyanate. One or more of these compounds are appropriately selected and used. Among them, from the viewpoint that the adhesive strength obtained after moisture curing is high, 4,4'-diphenylmethane diisocyanate is preferred.

In the present invention, the molar ratio of the hydroxyl group (OH) of the polyol (C) to the isocyanate group (NCO) of the polyisocyanate (B), namely NCO/OH, is in the range of 1.1 to 10. When the molar ratio of NCO/OH falls in this range, the viscosity of the adhesive composition is appropriate, handleability is satisfactory, and the adhesive strength obtained after moisture curing is also satisfactory.

In the present invention, it is preferable that relative to 100 parts by mass of the total content of the polymer (A), polyisocynate (B) and polyol (C), the content of the polymer (A) be 1 to 50 parts by mass, and the total content of the polyisocyanate (B) and the polyol (C) be 50 to 99 parts by mass, and more preferably, the content of the polymer (A) be 10 to 30 parts by mass, and the total content of the polyisocyanate (B) and the polyol (C) be 70 to 90 parts by mass.

When the content of the polymer (A) is 1 part by mass or more, while the total content of the polyisocyanate (B) and the polyol (C) is 99 parts by mass or less, the initial adhesive strength tends to become satisfactory. Also, when the content of the polymer (A) is 50 parts by mass or less, while the total content of the polyisocyanate (B) and the polyol (C) is 50 parts by mass or more, the storage stability and the adhesive strength obtained after moisture curing tend to increase.

In the present invention, in addition to the polymer (A), polyisocyanate (B) and polyol (C), a curing catalyst which accelerates the reaction between isocyanate and water during curing, as well as a filler, a pigment, a softening agent, a stabilizer, a deterioration preventing agent, a wetting agent, a thickening agent, a defoamer, a plasticizer, a rheology adjusting agent, a polymer such as thermoplastic resin other than those mentioned above, a dehydrating agent such as silane, benzoyl chloride, another polyol such as aliphatic polyol, an ultraviolet indicator, and the like may also be incorporated. When such additional conventional components are used, the components are selected and used after consideration of the reactivity of the isocyanate group.

As for the curing catalyst, for example, amines such as triethylenediamine, and tertiary amine ethers such as bis(2-dimethylaminoethyl) ether and dimorpholinodiethylether may be mentioned. A suitable example of the curing catalyst is dimorpholinodiethylether.

Mixing and heating of the polymer (A), polyisocyanate (B) and polyol (C) may be carried out by a method conventionally known in the production of hot melt adhesives. The polymer (A), polyisocyanate (B) and polyol (C) may be heated and mixed all at once, or may be heated and mixed in an arbitrary sequence.

For example, there can be mentioned a method of dissolving the polymer (A) in the polyol (C) by heat, adding the polyisocyanate (B) or a mixture of the polyisocyanate (B) and the polyol (C) thereto, and heating and mixing the mixture; a method of heating and mixing the polyisocyanate (B) and the polyol (C), adding the polymer (A) thereto, and heating and mixing the resulting mixture; or the like.

Specifically, there is a method in which in a first step, a polymer (A) obtained by polymerization of a mixture of a vinyl monomer having a carboxyl group and a vinyl monomer having an epoxy group is dissolved in a polyether polyol by heat. Subsequently, a defoamer is added, and the mixture is stirred while heated under reduced pressure using a vacuum pump or the like, to thereby sufficiently remove moisture from the dissolved liquid. In a second step, a curing catalyst as well as a polyisocyanate and a polyester polyol are added to the product of the previous step, and the resulting mixture is stirred while heated under reduced pressure.

The heating temperature is in the range of 80 to 140° C., and preferably 90 to 110° C. Within this range of heating temperature, the respective components dissolve satisfactorily, the viscosity is decreased, and handleability becomes satisfactory. Furthermore, the reaction of the polymer (A), polyisocyanate (B) and polyether polyol (C) proceeds sufficiently.

In the production of the reactive hot melt adhesive of the present invention, a twin-screw extruder is preferably used, so as to mix the polyisocyanate (B), which is a high viscosity component, rapidly and uniformly.

The production of the RHMA of the present invention is preferably carried out by heating and mixing of the components while moisture is removed under reduced pressure with a vacuum pump or the like. The degree of depressurization is in the range of 10 to 45 MPa, and preferably 15 to 20 MPa. Within this range of degree of depressurization, the isocyanate does not undergo moisture curing, and a sufficient amount of isocyanate group remains in the RHMA.

After being produced by heating and mixing, the RHMA of the present invention can be directly sealed in a metal can or the like and stored, but can also be applied on both sides of a sheet-like objects and used as a sheet-like hot melt adhesive.

The RHMA of the present invention is applied on base materials by means of a heated spray device, a heated nozzle, a heater doctor blade, a heated roll coater, or the like. Usually, the RHMA is used after being heated and maintained hot at a temperature ranging from 50 to 150° C., so that a viscosity suitable for application onto base materials is obtained.

The RHMA is used by being applied on the base materials usually in an amount of about 50 to 250 g/m². Here, if one of the base materials is a fabric, the amount of application may be adjusted to about 1 to 50 g/m².

The RHMA of the present invention is applied on a first base material, and then a second base material is pasted thereon. In this case, the contact between the base materials and the RHMA may be increased by applying pressure with a roller or the like, after the second base material is pasted. The time for applying pressure can be arbitrarily determined.

Subsequently, the RHMA cools and solidifies to thereby provisionally bond the base materials, and absorbs moisture from the surroundings simultaneously with the cooling and solidification or after completion of the solidification, so that moisture curing proceeds. Moisture curing can be allowed to proceed through natural absorption of the moisture in air by the RHMA or also through intentional exposure of the RHMA to moisture by various arbitrary methods. For example, after the RHMA is applied on a first base material and a second base material is pasted thereon, the RHMA can be exposed to moisture by several methods described above. In particular, it is preferable that one of the base materials be a material which easily absorbs moisture, such as wood, paper or clothes.

The RHMA of the present invention is useful for bonding various base materials such as wood, metal, glass and fabrics. Examples of typical use include uses in wood lamination such as bonding of wooden panels, assembly of automobile interior decorations, and production of panels for construction. It is also usable for textile applications such as carpets or clothes, and in the production of footwear.

EXAMPLES

Hereinafter, the present invention will be described specifically by way of Examples, but the present invention is not intended to be limited to these Examples. Here, unless otherwise stated in the following, the term "parts" represents "parts by mass." The measurement and evaluation of various physical properties in Examples and Comparative Examples were carried out by the following methods.

(1) Glass Transition Temperature (Tg)

The glass transition temperature is calculated from the constituent mass fraction, $w_i$, by the above-described formula (1) by use of the $Tg_i$ of a homopolymer obtainable by homopolymerization of a monomer i.

(2) Molecular Weight (Mw, Mn and Mw/Mn)

The molecular weight was measured by gel permeation chromatography (GPC), using an apparatus "HLC-8120" (trade name, manufactured by Tosoh Corporation). The column used was TSKgel G5000HXL*GMHXL-L (trade name, manufactured by Tosoh Corporation). Furthermore, the calibration curve was produced using TSK standard polystyrenes F288/F80/F40/F10/F4/F1/A5000/A1000/A500 (trade names, manufactured by Tosoh Corporation) and a styrene monomer.

The measurement was carried out at 40° C. using 100 μl of a solution prepared by dissolution of a polymer in tetrahydrofuran (THF) in an amount of 0.4% by mass. The weight average molecular weight (Mw), the number average molecular weight (Mn), and the ratio of weight average molecular weight/number average molecular weight (Mw/Mn) were calculated in terms of standard polystyrene.

(3) Initial Adhesive Strength

Two wooden bars, each having a width of 2 cm, a length of 15 cm and a thickness of 1.5 mm, were provided, on one of which a RHMA which had been melted by heat at 120° C. was applied from one end to a spot 2.5 cm away from the end. The adhesive-applied bar was maintained untouched for 30 seconds, the other wooden bar was then superimposed thereon from one end to a spot 2.5 cm away from the end, with the RHMA interposed between the two bars, and the two bars were pressed with fingers. The two wooden bars were left to stand on a testing bench for 4 minutes, with the adhesive interposed therebetween, and the RHMA was allowed to cool and solidify. After the standing, the two wooden bars were peeled off at 20° C. with a tensile testing machine described below, and the peel strength, namely the initial adhesive strength, was measured. From the obtained measurement values, the initial adhesive strength was evaluated by the following criteria. The initial adhesive strength is thought to be satisfactory if the value is 0.05 N/mm² or greater. The measurement was performed at a temperature of 20° C. and a humidity of 60%.

Tensile testing machine: Tensilon Universal Tensile Testing Machine equipped with a high temperature bath, "RTC-1250A" (trade name, manufactured by Orientec Co., Ltd.)

Measurement conditions: Tensile rate 5.08 mm/min

Initial chuck distance 50 mm

Evaluation

◎: 0.2 N/mm² or more

○: 0.1 N/mm² to less than 0.2 N/mm²

Δ: 0.05 N/mm² to less than 0.1 N/mm²

X: less than 0.05 N/mm²

(4) Resistance to Stringiness

Three grams of a RHMA melted by heat at 120° C. was placed on a hot plate maintained at 120° C. The RHMA on the hot plate was scooped up with one end of a wooden rectangular section bar (4 mm×5 mm and length of 20 cm), the bar was raised up to a height of 55 cm from the hot plate within one second, and it was visually observed, whether the adhesive would break off. This was repeated five times, and the resistance to stringiness was evaluated on the basis of the following criteria.

○: Break-off was observed 3 to 5 times, excellent

Δ: Break-off was observed 1 to 2 times, good

X: No break-off at all, poor (5) Acid Value

One gram of a sample was precisely weighed and dissolved in 50 g of a solvent (isopropanol/acetone/water=50/25/25 in a mass % ratio), and the solution was titrated with a 0.2 N KOH-ethanol solution, using phenolphthalein as indicator. The acid value (mg KOH/g), which is the number of mg of KOH required to neutralize 1 g of a solid matter, was calculated from the titration volume, A (ml), by the following formula (2).

Acid value=A×0.2×f×56.1/mass of a solid matter in the sample (g) where f is the factor of the 0.2 N KOH-ethanol solution.

Preparation Example 1

Preparation of Dispersant-1

Nine hundred parts of deionized water, 60 parts of sodium 2-sulfoethyl methacrylate, 10 parts of potassium methacrylate and 12 parts of methyl methacrylate were charged and stirred in a polymerization apparatus equipped with a stirrer, a cooling tube and a thermometer. While the polymerization apparatus was purged with nitrogen, the internal temperature was raised to 50° C. During the course, 0.08 parts of 2,2'-azobis(2-methylpropionamidine) dihydrochloride was added thereto as a polymerization initiator, and the temperature was further raised to 60° C. After raising the temperature, methyl methacrylate was continuously added dropwise for 75 minutes at a rate of 0.24 parts/min, using a dropping pump. The reaction solution was maintained at 60° C. for 6 hours, and then cooled to room temperature, to thereby obtain a dispersant-1 having a solid content of 10% by mass as a transparent aqueous solution.

Preparation Example 2

Preparation of Polymer (A)-1

One hundred and seventy parts of deionized water, 0.1 parts of sodium sulfate and 0.015 parts of the dispersant-1 having a solid content of 10% by mass were charged and stirred in a polymerization apparatus equipped with a stirrer, a cooling tube and a thermometer, to obtain a uniform aqueous solution. Subsequently, 0.6 parts of methacrylic acid (MAA), 1.9 parts of glycidyl methacrylate (GMA), 68.5 parts of methyl methacrylate (MMA), 29 parts of n-butyl methacrylate (BMA), 1.7 parts of n-dodecylmercaptan, and 1.5 parts of lauroyl peroxide were added thereto, to obtain an aqueous suspension. Subsequently, the polymerization apparatus was purged with nitrogen, the internal temperature was raised to 70° C., and the system was allowed to react for about one hour. To further increase the polymerization ratio, the system was heated to 95° C. and maintained at that temperature for 30 minutes. Subsequently, the reaction liquid was cooled to 40° C., and thus an aqueous suspension containing a polymer was obtained. This aqueous suspension was filtered through a nylon filter cloth having a mesh size of 45 μm, and the filter cake was washed with deionized water, dehydrated and dried for 16 hours at 40° C., to obtain a polymer (A)-1. This polymer (A)-1 had Tg=75° C., Mw=20,600, Mw/Mn=1.90, and acid value=4.0 mg KOH/g.

Preparation Examples 3 to 6

Preparation of Polymers (A)-2 to (A)-5

Polymers (A)-2 to (A)-5 were obtained in the same manner as in Preparation Example 2, except that the monomer composition was changed as indicated in Table 1.

Example 1

In a reaction apparatus equipped with a stirrer and a thermometer, 37.8 parts of polypropylene glycol, "PPG-2000" (trade name, manufactured by Bayer Material Science AG), and 2.73 parts of polypropylene glycol, "PPG-425" (trade name, manufactured by Bayer Material Science AG) as polyols, and 21.8 parts of the polymer (A)-1 produced in Preparation Example 2 were charged, and the mixture was stirred for one hour at 100° C., to thereby obtain a uniform solution. Then, 0.3 parts of a defoamer, "MODAFLOW 2100" (trade name, manufactured by Surface Specialties, Inc.), was added to the solution, and the mixture was heated for 30 minutes at 15 kPa and 100° C. while stirred, to obtain a uniform solution.

To this solution, 21.51 parts of a polyester polyol, "DYNACOLL 7360" (trade name, manufactured by Evonik Degussa Japan Co., Ltd.) as a polyol, 14.80 parts of 4,4'-diphenylmethane diisocyanate as a polyisocyanate, and 0.045 parts of 2,2'-dimorpholinodiethylether (DMDEE) as a curing catalyst were added, and the resulting mixture was stirred for 30 minutes at 15 kPa and 100° C. Subsequently, the mixture was cooled, and thus a RHMA was obtained. The RHMA was sealed in a nitrogen atmosphere and stored.

The equivalent ratio of the respective functional groups was carboxyl group/epoxy group/hydroxy group/isocyanate group=0.5/1/80/150.

This RHMA was used to carry out measurements and evaluation of various properties. The evaluation results are presented in Table 1.

Examples 2 to 3 and Comparative Examples 1 to 2

RHMAs were obtained in the same manner as in Example 1, except that the polymer (A)-1 was changed to the polymers (A)-2 to (A)-5, respectively, and these polymers were used so that the total equivalent ratio of the carboxyl group and the epoxy group would become 1.5. Evaluation of the adhesives was also performed in the same manner as in Example 1. The evaluation results are presented in Table 1.

Reference Example

A hot melt adhesive was obtained in the same manner as in Example 1, except that the polymers (A)-4 and (A)-5, which were used in Comparative Examples 1 and 2 as the polymer (A), were blended at a mass ratio of 1:1, and the resultant mixture was used so that the total equivalent ratio of the carboxyl group and the epoxy group would become 1.5. Evaluation of the hot melt adhesive was also performed in the same manner as in Example 1. The results are presented in Table 1. This hot melt adhesive was found to have lower adhesive strength than the adhesive of Example 1, which had an identical Tg.

TABLE 1

| | | | Example 1 | Example 2 | Example 3 | Comparative Example 1 | Comparative Example 2 | Reference Example* |
|---|---|---|---|---|---|---|---|---|
| Polymer (A) | No. | | 1 | 2 | 3 | 4 | 5 | 4/5 |
| | Monomer composition** (parts) | MAA | 0.6 | 0.6 | 0.6 | 0.6 | — | 0.3 |
| | | GMA | 1.9 | 1.9 | 1.9 | — | 1.9 | 0.95 |
| | | MMA | 68.5 | 51.5 | 50.5 | 69.4 | 69.6 | 69.5 |
| | | BMA | 29 | 46 | 3.5 | 30 | 28.5 | 29.25 |
| | | IBXMA | — | — | 43.5 | — | — | — |
| | Calculated Tg (° C.) | | 75 | 60 | 120 | 75 | 75 | 75 |
| | Molecular weight (Mw) | | 20600 | 19900 | 18000 | 20300 | 20300 | 20300 |
| | Mw/Mn | | 2.0 | 2.0 | 2.0 | 1.9 | 1.7 | 1.8 |
| | Acid value (mg KOH/g) | | 4.0 | 4.0 | 4.0 | 4.0 | — | 1.9 |
| Equivalent ratio of functional group | Carboxyl group | | 0.5 | 0.5 | 0.5 | 0.5 | — | 0.25 |
| | Epoxy group | | 1.0 | 1.0 | 1.0 | — | 1.0 | 0.5 |
| | Isocyanate group | | 150 | 150 | 150 | 150 | 150 | 150 |
| | Hydroxyl group | | 80 | 80 | 80 | 80 | 80 | 80 |

TABLE 1-continued

| | | Example 1 | Example 2 | Example 3 | Comparative Example 1 | Comparative Example 2 | Reference Example* |
|---|---|---|---|---|---|---|---|
| Evaluation | Initial adhesive strength (N/mm$^2$) | ◎ (0.238) | Δ (0.083) | ○ (0.127) | X (0.027) | X (0.041) | Δ (0.073) |
| | Resistance to stringiness | ○ | ○ | ○ | ○ | ○ | ○ |

*The polymer (A) used was a mixture of the polymers (A)-4 and (A)-5, and the data are indicated using an average value.
**The abbreviations for the monomers are as follows: MAA: Methacrylic acid, GMA: Glycidyl methacrylate, HEMA: 2-Hydroxyethyl methacrylate, MMA: Methyl methacrylate, BMA: n-Butyl methacrylate, IBXMA: Isobornyl methacrylate.

According to the present invention, a RHMA having no problem in the initial adhesive strength, the adhesive strength obtained after moisture curing, stringiness and the like can be obtained. This RHMA has enhanced handleability at the time of use and enhanced productivity, and has high adhesive strength to base materials. Thus, the RHMA is very useful in industry.

What is claimed is:

1. A method for producing a reactive hot melt adhesive composition, comprising heating a mixture of:
   a polymer (A);
   a polyisocyanate (B); and
   a polyol (C),
   wherein said polymer (A) is obtained by polymerizing a monomer mixture comprising a vinyl-based monomer comprising a carboxyl group and a vinyl-based monomer comprising an epoxy group, said polymer (A) comprising both carboxyl groups and epoxy groups.

2. The method for producing a reactive hot melt adhesive composition according to claim 1, wherein a glass transition temperature of the polymer (A) is in the range of 70 to 100° C.

3. A reactive hot melt adhesive composition obtained by the method according to claim 1 or 2.

4. A method for carrying out adhesion, comprising:
   heating and melting the reactive hot melt adhesive composition according to claim 3;
   applying the adhesive composition on a base material; and then
   moisture-curing the adhesive composition.

5. The method for producing a reactive hot melt adhesive composition according to claim 1, wherein
   the acid value of polymer (A) is 1 to 200 mg KOH/g;
   the equivalent ratio of the carboxyl group to the epoxy group in polymer (A) is 1/75 to 75/1;
   polymer (A) has a weight average molecular weight (Mw) in the range of 5,000 to 50,000; and
   the ratio of weight average molecular weight/number average molecular weight (Mw/Mn) of polymer (A) is 4 or less.

6. The method for producing a reactive hot melt adhesive composition according to claim 1, wherein the molar ratio of the hydroxyl group (OH) of polyol (C) to the isocyanate group (NCO) of the polyisocyanate (B), NCO/OH, in the mixture is 1.1 to 10.

7. The method for producing a reactive hot melt adhesive composition according to claim 1, wherein the amount of polymer (A) is 1 to 50 parts by mass, and the amount of polyisocyanate (B) and polyol (C) is 50 to 99 parts by mass, relative to 100 parts by mass of the total amount of polymer (A), polyisocyanate (B) and polyol (C).

8. The method for producing a reactive hot melt adhesive composition according to claim 1, wherein the amount of polymer (A) is 10 to 30 parts by mass, and the amount of polyisocyanate (B) and polyol (C) is 70 to 90 parts by mass, relative to 100 parts by mass of the total amount of polymer (A), polyisocyanate (B) and polyol (C).

9. The method for producing a reactive hot melt adhesive composition according to claim 1, wherein the mixture is heated to a temperature of 80 to 140° C.

10. The method for producing a reactive hot melt adhesive composition according to claim 1, wherein the mixture is heated to a temperature of 90 to 110° C.

11. The method for producing a reactive hot melt adhesive composition according to claim 1, further comprising heating and mixing polymer (A), polyisocyanate (B) and polyol (C) while removing moisture under reduced pressure.

12. The method for producing a reactive hot melt adhesive composition according to claim 11, where said reduced pressure is in the range of 10 to 45 MPa.

13. The method for producing a reactive hot melt adhesive composition according to claim 1, wherein
   the acid value of polymer (A) is 1 to 200 mg KOH/g;
   the equivalent ratio of the carboxyl group to the epoxy group in polymer (A) is 1/75 to 75/1;
   polymer (A) has a weight average molecular weight (Mw) in the range of 5,000 to 50,000;
   the ratio of weight average molecular weight/number average molecular weight (Mw/Mn) of polymer (A) is 4 or less;
   the molar ratio of the hydroxyl group (OH) of polyol (C) to the isocyanate group (NCO) of the polyisocyanate (B), NCO/OH, in the mixture is 1.1 to 10;
   the amount of polymer (A) is 1 to 50 parts by mass, and the amount of polyisocyanate (B) and polyol (C) is 50 to 99 parts by mass, relative to 100 parts by mass of the total amount of polymer (A), polyisocyanate (B) and polyol (C); and
   the mixture is heated to a temperature of 80 to 140° C.

14. A reactive hot melt adhesive composition obtained by the method according to claim 13.

15. A method for carrying out adhesion, comprising:
   heating and melting the reactive hot melt adhesive composition according to claim 14;
   applying the adhesive composition on a base material; and then
   moisture-curing the adhesive composition.

* * * * *